(12) United States Patent
Salu et al.

(10) Patent No.: US 11,274,049 B2
(45) Date of Patent: Mar. 15, 2022

(54) METHODS AND SYSTEMS FOR OPTIMIZING CORROSION AND SCALE INHIBITOR INJECTION RATES IN PROCESS PLANTS

(71) Applicant: Saudi Arabian Oil Company, Dhahran (SA)

(72) Inventors: Samusideen Adewale Salu, Ras Tanura (SA); Mohamed Soliman, Ras Tanura (SA); Talal Zahrani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 16 days.

(21) Appl. No.: 16/843,097

(22) Filed: Apr. 8, 2020

(65) Prior Publication Data

US 2021/0317006 A1    Oct. 14, 2021

(51) Int. Cl.
  *C02F 1/00*   (2006.01)
  *C02F 5/00*   (2006.01)
  *C02F 103/10* (2006.01)

(52) U.S. Cl.
  CPC ............... *C02F 1/008* (2013.01); *C02F 5/00* (2013.01); *C02F 2103/10* (2013.01); *C02F 2209/006* (2013.01); *C02F 2209/40* (2013.01); *C02F 2303/08* (2013.01)

(58) Field of Classification Search
  None
  See application file for complete search history.

(56) References Cited

U.S. PATENT DOCUMENTS

| | | | |
|---|---|---|---|
| 3,256,902 A | 6/1966 | Porter | |
| 5,353,237 A | 10/1994 | Bass et al. | |
| 8,447,529 B2 | 5/2013 | Hernandez et al. | |
| 9,092,124 B2 | 7/2015 | Amminudin et al. | |
| 10,047,303 B2 | 8/2018 | Rustad et al. | |
| 10,316,261 B2 | 6/2019 | Scattergood et al. | |
| 10,472,576 B2 | 11/2019 | Salu et al. | |
| 2009/0112364 A1 | 4/2009 | Chen et al. | |

(Continued)

FOREIGN PATENT DOCUMENTS

| | | |
|---|---|---|
| CN | 1514248 A | 7/2004 |
| RU | 2661500 C1 | 7/2018 |

OTHER PUBLICATIONS

Bassey, Bassey O.; "Asset Integrity and Profitability Enhancement at Three Process Facilities through Corrosion Prevention, Control and Management" Coventry University, Coventry, United Kingdom (2017), pp. 1-28.

(Continued)

*Primary Examiner* — Richard C Gurtowski
(74) *Attorney, Agent, or Firm* — Bracewell LLP; Constance G. Rhebergen; Vivek P. Shankam (57) ABSTRACT

Control strategy and algorithms to be utilized in a programmable logic control for automating injection rates of corrosion inhibitor and scaling inhibitor in a process plant. The logic control system can be programmed on a Distributed Control System (DCS) or Supervisory Control And Data Acquisition (SCADA) of the plant. The automating system is developed with the objective of optimizing corrosion inhibitor and scale inhibitor usage, thereby reducing operating cost, improving the reliability and integrity of process plant facilities, and preventing undesirable incident of loss of containment.

16 Claims, 5 Drawing Sheets

(56) References Cited

U.S. PATENT DOCUMENTS

| | | |
|---|---|---|
| 2010/0063639 A1 | 3/2010 | Gothard |
| 2010/0163469 A1 | 7/2010 | Wan et al. |
| 2014/0186210 A1* | 7/2014 | Gill .......................... C23F 11/08 422/3 |
| 2018/0195010 A1 | 7/2018 | Salu et al. |

OTHER PUBLICATIONS

Pu, Chun-sheng et al.; "A Computer Simulation System for Predicting the Effectiveness of Scale Inhibitor Injection in the Oil Fields" (abstract only); available as of Feb. 5, 2020 at http://en.cnki.com.cn/Article_en/CJFDTotal-XASY504.002.htm; pp. 1-2.

International Search Report and Written Opinion for International Application No. PCT/US2021/070359, report dated Jun. 24, 2021; pp. 1-14.

\* cited by examiner

METHODS AND SYSTEMS FOR OPTIMIZING CORROSION AND SCALE INHIBITOR INJECTION RATES IN PROCESS PLANTS

TECHNICAL FIELD

Example embodiments relate to methods and systems for optimizing corrosion inhibitor and scale inhibitor injection rate in a process plant.

BACKGROUND

Abundant supplies of fresh water are essential to the development of industry. Enormous quantities are required for the cooling of products and equipment, for process needs, for boiler feed, and for sanitary and potable water supply. It is becoming increasingly apparent that fresh water is a valuable resource that must be protected through proper management, conservation, and use. In order to insure an adequate supply of high quality water for industrial use, the following practices must be implemented: (1) purification and conditioning prior to consumer (potable) or industrial use; (2) conservation (and reuse where possible); and/or (3) wastewater treatment.

The solvency power of water can pose a major threat to industrial equipment. Corrosion reactions cause the slow dissolution of metals by water and eventually structural failure of process equipment. Deposition reactions, which produce scale on heat transfer surfaces and which can cause both loss of energy efficiency and loss of production, represent a change in the solvency power of water as its temperature is varied. The control of corrosion and scale is a major focus of water treatment technology.

Typical industrial water systems are subject to considerable variation. The characteristics of water composition can change over time. The abruptness and degree of change depend upon the source of the water. Water losses from a recirculating system, changes in production rates, and chemical feed rates all introduce variation into the system and thereby influence the ability to maintain proper control of the system.

General corrosion is widespread and occurs on a relatively large scale or relatively large area. General corrosion is relatively uniform on the surface of a pipe or vessels in the target system, or on a sensor. General corrosion damages and removes metal mass, which changes the geometry, i.e., thickness of the surface, and causes a degradation or depletion of original material. General corrosion compromises the structural rigidity and integrity of a pipe or vessel. Exemplary general corrosion can include, but is not limited to, large-scale surface oxidation, e.g., to form metal oxides. On the other hand, localized corrosion may be widespread or limited to only a few areas of the target system, but is relatively non-uniform and occurs on a relatively small scale. Exemplary localized corrosion can include, but is not limited to, pitting, environmental stress cracking (ESC), (hydrogen) embrittlement, etc, as well as combinations thereof.

Typically, given a particular calcium ion content in water, a treatment comprised of an inorganic orthophosphate together with a water soluble polymer is used to form a protective film on metallic surfaces in contact with aqueous systems, in particular cooling water systems, to thereby protect such from corrosion. The water soluble polymer is critically important to control calcium phosphate crystallization so that relatively high levels of orthophosphate may be maintained in the system to achieve the desired protection without resulting in fouling or impeded heat transfer functions which normally are caused by calcium phosphate deposition. Water soluble polymers are also used to control the formation of calcium sulfate and calcium carbonate and additionally to dispense particulates to protect the overall efficiency of water systems.

In the oil and gas industry, raw wild crude produced from wells typically consist of a mixture of gas, liquid hydrocarbons, and salty formation water. In the upstream section of oil and gas industries, the function of a Gas Oil Separation Plant (GOSP) is to adequately separate gas and salty water from the crude oil to acceptable specifications for easy transportation and for downstream processing. For instance, excessive salt and water in crude oil from GOSP may result in high corrosion in transportation pipeline and refining units and may also have detrimental scaling effects on processing units and on catalysts. As part of the GOSP operation, produced crude oil is separated from associated salty water in a Wet Crude Handling Facility (WCHF) comprising of mainly crude dehydrator and desalter vessels. The salty water produced along with the crude often require use of corrosion and scale inhibition chemicals to prevent corrosion and scale formation in the system. The control of corrosion inhibitor and scale inhibitor injection rates are presently by manually adjusting the injection pumps strokes at the field. An injection rate change is required whenever there is change in any one of the following: production rate or percentage water content or process operating conditions or the amount of Total Dissolved Solids (TDS) in solution or percentage of corrosive or scaling contents of process fluid mixture.

A need exists within the industry for a control system that optimizes usage of corrosion and scale inhibition chemicals and minimizes cost of the treatment chemicals, resulting in a more efficient and economical processes.

SUMMARY

The existing control of corrosion and scale inhibitor injection in most facilities is by manually adjusting the injection pumps strokes. This manual adjustment may cause excessive or inadequate injection of chemicals. Automating the chemical injection can allow the injection rate to be adjusted automatically through the distributed control systems (DCS) or supervisory control and data acquisition (SCADA) whenever there is change in production rate or water cut or process operating conditions or total dissolved solids (TDS) in solution. An automatic controlled corrosion and scale inhibitors injection system can reduce the chemical usage, provide mean of effective corrosion and scale management, improve integrity and reliability of facilities, and minimize failures that could lead to releases resulting from insufficient corrosion or scale inhibition injection. Consequently, a substantial saving is expected from corrosion and scale inhibitor costs as a result of automating the injection system. Similarly, the same methodology can be adopted for injection of other chemicals such as hydrate inhibitors, foam inhibitors, oxygen scavenger, etc.

Methods and systems for automating injection rates of corrosion inhibitors and scale inhibitor in a process plant are disclosed. The method steps are carried out by a processor or programmable logic control system that can be developed or programmed on a distributed control system (DCS) of the plant. One embodiment is an automated system with the objective of optimizing corrosion inhibitor and scale inhibitor usage, thereby reducing operating cost, improving the reliability and integrity of process plant facilities, and preventing undesirable incident of loss of containment. The control strategy and algorithms used in the methods and systems rely on the result of corrosion rates (CR) or scale deposit rate (SDR) measurement from the corrosion/scale monitoring system (if available) or coupons to establish appropriate action to increase or decrease the corrosion/scale inhibition dosage. Combined application of corrosion/scale monitoring system with use of Electronic Capacity Control (ECC) chemical injection pump technology that are capable of receiving remote signal to control pump discharge rates via the DCS/SCADA for corrosion inhibitor chemical and scale inhibitor injection is required for automating control of injection rates from DCS/SCADA.

One example embodiment is a system for optimizing corrosion inhibitor injection rate in a GOSP. The system includes a programmable logic controller operatively coupled to a control unit associated with the plant, and a non-transitory computer-readable medium in communication with the programmable logic controller and having stored thereon a set of instructions that when executed cause the programmable logic controller to perform operations comprising receiving a current flow rate for a fluid stream into which the corrosion inhibitor is injected, receiving a current injection rate of the corrosion inhibitor, receiving a current value of corrosion rate from a corrosion monitoring system, determining that the corrosion rate is greater than a predetermined threshold value, determining a new corrosion inhibitor injection rate, and causing to modify the injection rate in one or more pumps to the new corrosion inhibitor injection rate. The step of modifying the injection rate in one or more pumps includes adjusting a stroke in one or more of the corrosion inhibitor injection pumps. The new corrosion inhibitor injection rate is determined based on the formula:

$$Q_{CI,L}=([PPM]*Q_L)/16666.67$$

where $Q_{CI,\ L}$=flow rate of corrosion inhibitor;
$Q_L$=flow rate of fluid; and
[PPM]=Corrosion Inhibitor dosage in part per million volume (PPM).

Another example embodiment is a method for optimizing corrosion inhibitor injection rate in a GOSP. The method includes receiving a current flow rate for a fluid stream into which the corrosion inhibitor is injected, receiving a current injection rate of the corrosion inhibitor, receiving a current value of corrosion rate from a corrosion monitoring system, determining that the corrosion rate is greater than a predetermined threshold value, determining a new corrosion inhibitor injection rate, and causing to modify the injection rate in one or more pumps to the new corrosion inhibitor injection rate. The step of modifying the injection rate in one or more pumps includes adjusting a stroke in one or more of the corrosion inhibitor injection pumps. The new corrosion inhibitor injection rate is determined based on the formula:

$$Q_{CI,L}=([PPM]*Q_L)/16666.67$$

where $Q_{CI,\ L}$=flow rate of corrosion inhibitor;
$Q_L$=flow rate of fluid; and
[PPM]=Corrosion Inhibitor dosage in part per million volume (PPM).

One example embodiment is a system for optimizing scaling inhibitor injection rate in a GOSP. The system includes a programmable logic controller operatively coupled to a control unit associated with the plant, and a non-transitory computer-readable medium in communication with the programmable logic controller and having stored thereon a set of instructions that when executed cause the programmable logic controller to perform operations comprising receiving a current flow rate for a fluid stream into which the scaling inhibitor is injected, receiving a current injection rate of the scaling inhibitor, receiving a current value of scaling rate from a scaling monitoring system, determining that the scaling rate is greater than a predetermined threshold value, determining a new scaling inhibitor injection rate, and causing to modify the injection rate in one or more pumps to the new scaling inhibitor injection rate. The step of modifying the injection rate in one or more pumps includes adjusting a stroke in one or more of the scaling inhibitor injection pumps. The new scaling inhibitor injection rate is determined based on the formula:

$$Q_{SI,L}=([PPM]*Q_L)/16666.67$$

where $Q_{SI,\ L}$=flow rate of scaling inhibitor;
$Q_L$=flow rate of fluid; and
[PPM]=Scaling Inhibitor dosage in part per million volume (PPM).

Another example embodiment is a method for optimizing scaling inhibitor injection rate in a GOSP. The method includes receiving a current flow rate for a fluid stream into which the scaling inhibitor is injected, receiving a current injection rate of the scaling inhibitor, receiving a current value of scaling rate from a scaling monitoring system, determining that the scaling rate is greater than a predetermined threshold value, determining a new scaling inhibitor injection rate, and causing to modify the injection rate in one or more pumps to the new scaling inhibitor injection rate. The step of modifying the injection rate in one or more pumps includes adjusting a stroke in one or more of the scaling inhibitor injection pumps. The new scaling inhibitor injection rate is determined based on the formula:

$$Q_{SI,L}=([PPM]*Q_L)/16666.67$$

where $Q_{SI,\ L}$=flow rate of scaling inhibitor;
$Q_L$=flow rate of fluid; and
[PPM]=Scaling Inhibitor dosage in part per million volume (PPM).

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure can now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure can be thorough and complete, and can fully convey its scope to those skilled in the art. Like numbers refer to like elements throughout.

Figure 1A:
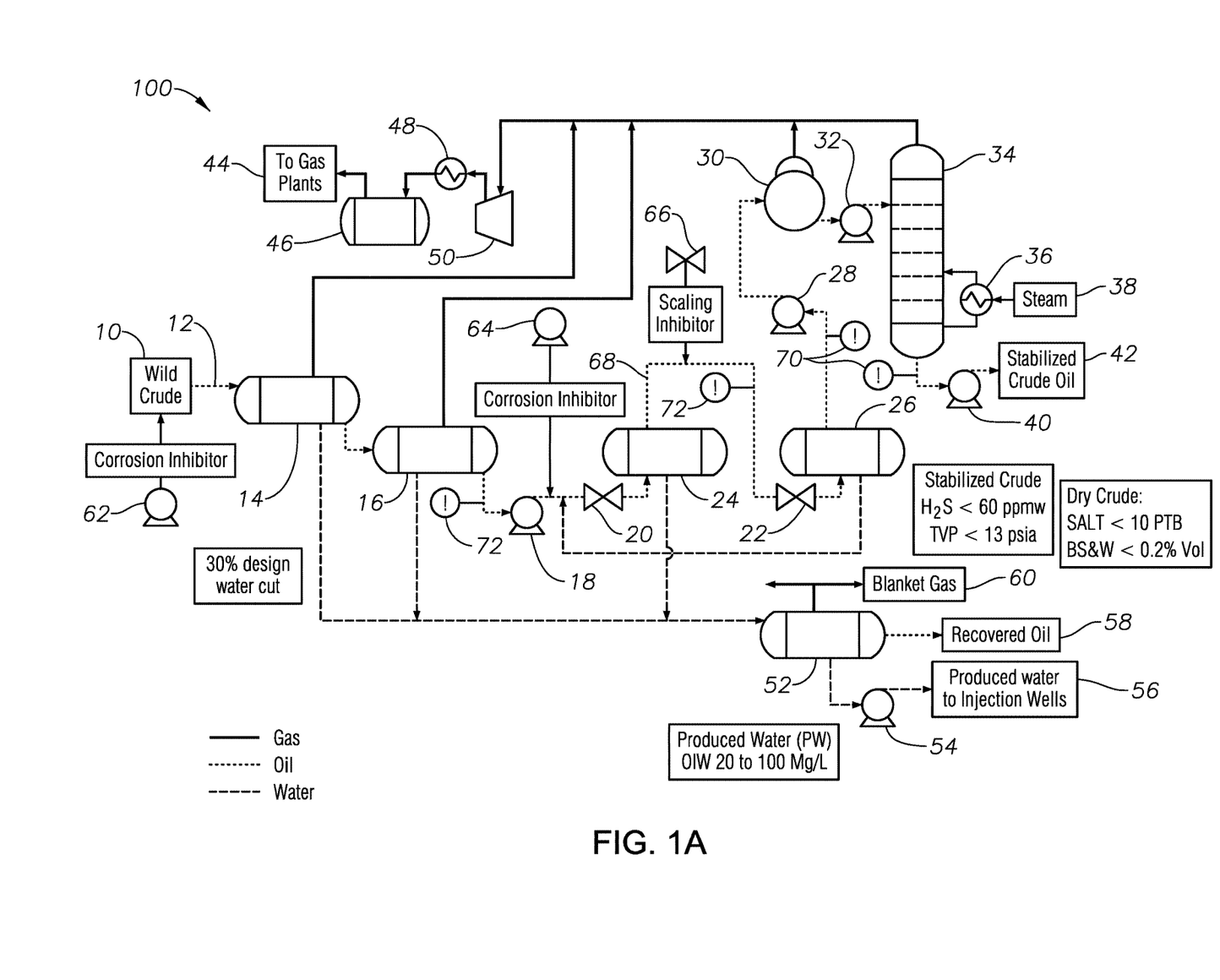
FIG. 1A is a schematic showing common features for optimizing corrosion inhibitor and scale inhibitor injection rate in a GOSP, according to one or more example embodiments of the disclosure.

FIG. 1A is a schematic showing common features for optimizing corrosion inhibitor and scale inhibitor injection rate in a GOSP 100, according to one or more example embodiments of the disclosure. GOSP 100 receives wild/wet crude 10 from upstream field via a trunk line 12 that feeds the crude into a three-phase separation vessel, a High Pressure Production Trap (HPPT) 14, where the first stage of gas and free water separation from the crude takes place. The separated wet crude from the HPPT 14 is fed into a second stage three-phase separation vessel, a Low Pressure Production Trap (LPPT) 16 for further separation of more gas and water from the crude at a lower pressure. In some example GOSP configurations, the wet crude from the LPPT may also be channeled through a wet/dry heat exchangers into a three-phase Low Pressure Degassing Tanks (LPDT) or separator that normally operates at almost atmospheric pressure (circa 3 psig) for more gas and water to be removed from the wet crude 10. It should be noted, however, that the two additional unit operations, for example, wet/dry heat exchanger and LPDT are not shown in the GOSP illustrated in FIG. 1A.

The wet crude oil from the LPPT 16 or LPDT is transferred by crude charge pumps 18 into Wet Crude Handling Facilities (WCHF) via mixing valves 20, 22. The WCHF may include a Wet Crude Handling (WCH) dehydrator 24 and a single/double stage WCH desalter 26. Crude 10 must be treated in the WCHF to meet first the Basic Sediment and Water specification of 0.2 v/v % and then the salt content of less than 10 PTB (pounds per thousand barrels). The dehydrated/desalted crude is then pumped into an atmospheric spheroid or degassing tank 30 via shipper pump 28 and then flows to a crude stabilizer column 34 via booster pump 32, where it is stripped of volatile components and stabilized to export grade crude specification of 13 TVP (True Vapor Pressure) at 130° F. and its $H_2S$ content removed to a required specification of 10 ppm wt. $H_2S$. Optionally, steam 38 may be injected into the crude after emerging from the reboiler 36 and before entering into the crude stabilizer. The produced export grade crude or stabilized oil 42 is finally pumped by shipper pumps 40 to its export terminal or refinery destination. The gas streams from the production traps 14, 16, degassing tank 30, and the stabilizer 34 flow to the gas gathering compression system for onward delivery to the gas processing plants 44. Each stage of the compression plant consist of a gas compressor 50, a compressor discharge cooler 48 and a compressor discharge gas knock-out vessel 46 The water stream from the productions traps 14, 16, and the WCH dehydrator 24 is pumped to a Water Oil Separator (WOSEP) 52 where the WOSEP separates water 56 from recovered oil 58. Blanket gas 60 is used to maintain normal operating pressure in the WOSEP. The WOSEP removes the oil content of inlet produced water to less than 100 ppm at the outlet as the disposal water, which is injected, via an injection pump 54, back into the reservoir for water-flooding and pressure maintenance.

As shown in FIG. 1A, corrosion inhibitor injection points 62, 64 are provided within a GOSP 100 as required for corrosion mitigation in the plant. The scale inhibitor 66 is injected into the dehydrated crude 68 entering the desalter 26 to minimize scale build-up in the system. The system illustrated in FIG. 1A may be equipped with one or more sensors 70, 72 to measure the corrosion and scale build up rate. For example, the system may include one or more sensors, such as corrosion and scale build up rate meters 70 for measuring a current value of corrosion and scale build up rate at selected parts of interest of the plant.

Figure 1B:
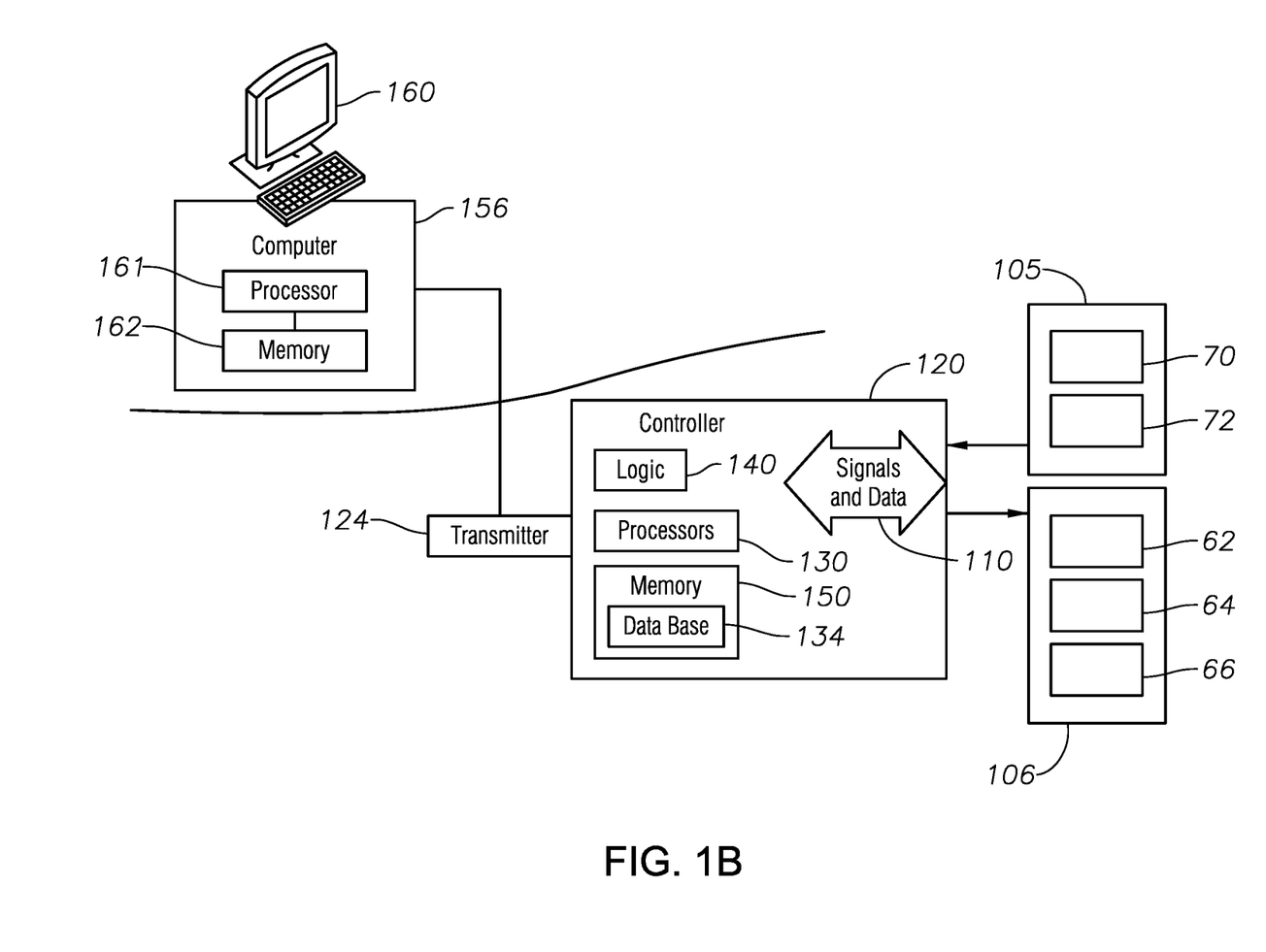
FIG. 1B is an extension of the system illustrated in FIG. 1A.

FIG. 1B is an extension of the system illustrated in FIG. 1A in accordance with one or more example embodiments. The system can include one or more sensors 105, one or more actuators 106, and one or more controllers 120. Controller 120 can be operatively coupled to the sensors 105 and actuators 106 for controlling operation of the actuators 106 as well as retrieving or reading data from the sensors 105. The data can include sensor data for example from corrosion and scale build up rate meters 70 reading a current value of corrosion and scale build up rate at selected points of interests of the plant 100.

The processor or programmable logic controller (PLC) 120 can comprise a programmable drive and/or sampling control system. The controller can include logic 140 for acquiring sensor data and/or signals 110 from the sensors 105 and sending signals 110 to actuators 106. Memory 150, located inside or outside the controller 120, can be used to store acquired data, and/or processing results (e.g., in a database 134). The memory 150 is communicatively coupled to the processor(s) 130. While not shown in FIG. 1B, it should be noted that the memory 150 may be located in or outside of GOSP 100. A data transmitter 124 may be used to transmit data and/or signals to the outside the GOSP for display by the quality control system, for example. Thus, the system may include the data transmitter 124 (e.g., a telemetry transmitter) to transmit the data to a surface data processing computer 156.

The system can further include a computer 156 coupled to and configured to communicate with, control, and/or display data received from the controller 120. The computer 156 can include a processor 161 and memory 162 for controlling the system. A monitor 160 can be coupled to the computer for displaying data that can include sensor data, transformed (e.g., filtered) sensor data, and/or feedback control data. The processor or PLC 120 may form a part of the Distributed Control System (DCS) within the GOSP 100. The processor or PLC 120 may be operatively coupled to a set of sensors 105 from which data may be acquired, and a set of actuators 106 which may be controlled by the processor or PLC 120 based on the control strategy and algorithm stored in memory 150. Different control strategies and algorithms may be established for optimizing each of the scale inhibitor, and corrosion inhibitor injection rates as discussed in the following paragraphs.

Control Strategy for Corrosion inhibitor Injection

The objective of primary corrosion inhibitor injection 62 is to provide adequate amount of corrosion inhibitor chemical to the wet crude 10 stream at inlet 12 of the plant 100 that can be enough to minimize corrosion rate under normal operating conditions.

Performance factors of chemicals are numbers assigned to chemicals to indicate their effectiveness. Performance factors are calculated as a ratio of the required treatment dosage of a chemical, determined during laboratory bottle tests, to the treatment dosage of the chemical exhibiting the lowest effective treatment dosage. Therefore, the dosage of a corrosion or scale inhibitor in part per million (PPM) required for a particular service using a particular type of chemical and at an operating condition should be established by laboratory test. Whenever any of these parameters (chemical type, operating temperature and pressure, composition, etc.) change significantly, another laboratory test should be conducted to establish new effective dosage of the corrosion inhibitor in part per million (PPM). Bottle tests are normally performed to make the selection of the most cost effective chemical additive blend and establish injection dosage in PPM.

Factors such as changes in chemical type, operating temperature and pressure, composition or percentage of corrosive or scaling contents can be incorporated into an algorithm for controlling the rate of corrosion or scale inhibitor manually, by the plant engineer anytime there is a significant change in these factors. The plant engineer can use results of bottle tests to establish appropriate corrosion or scale inhibitor injection dosage in PPM. Alternatively, the plant engineer can rely on the result of corrosion rates (CR) or scale deposit rate (SDR) measurement from the corrosion or scale monitoring system to establish appropriate action to increase or decrease the corrosion or scale inhibition dosage. The new dosage can then be incorporated into already established control algorithm in the DCS/SCADA whenever there is a significant change in any of these parameters. The control strategy to be adopted can therefore involve the development of a base control algorithm which can be adjusted any time there is a change in these factors. The overall step-by-step approach to be followed for adjusting the dosage in the control algorithm is depicted by the flowchart in FIG. 2

Figure 2:
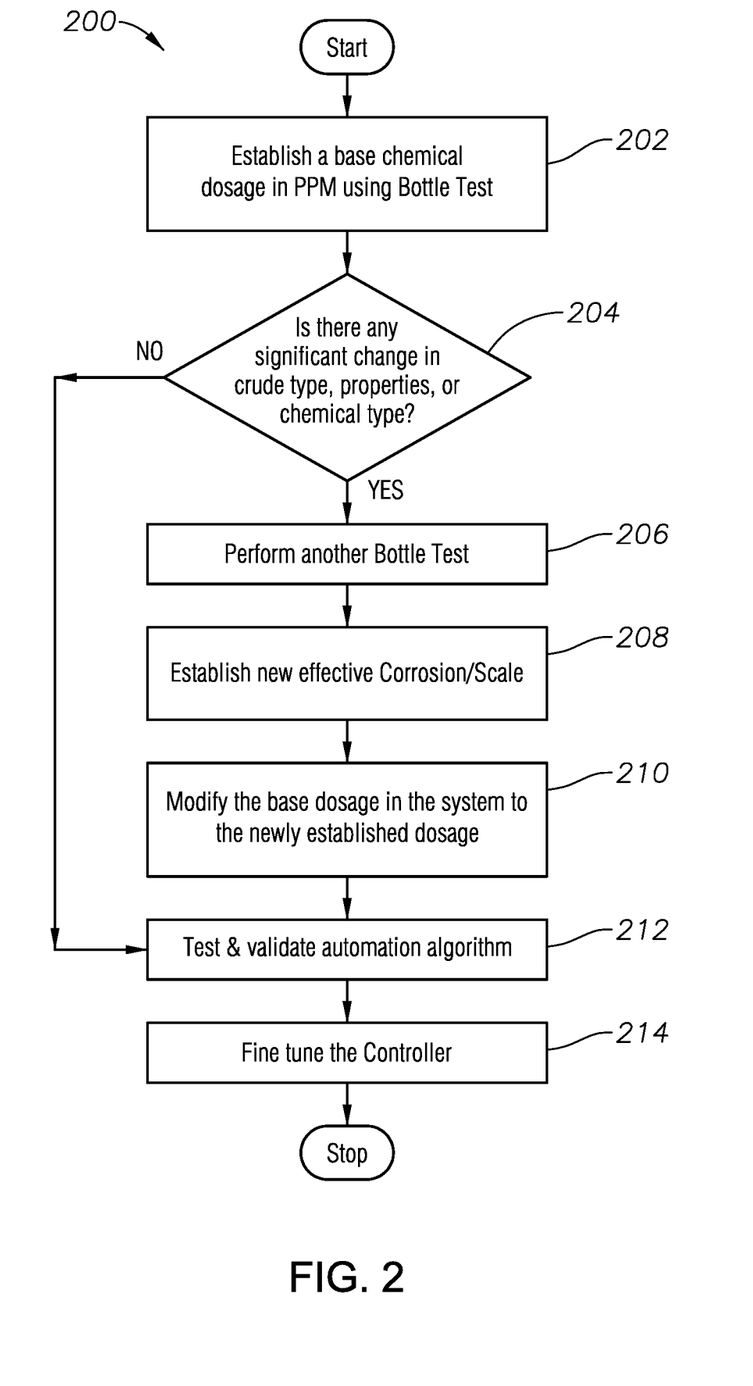
FIG. 2 is a flow diagram illustrating example steps in a method for optimizing corrosion inhibitor injection rate in a GOSP, according to one or more example embodiments of the disclosure.

FIG. 2 is a flow diagram illustrating example steps in a method 200 for optimizing corrosion inhibitor or scale inhibitor injection rate in a GOSP, according to one or more example embodiments of the disclosure. The method involves establishing a base chemical dosage (dosage for corrosion inhibitor or scale inhibitor) using field or bottle test dosage in PPM at step 202. The method then involves determining, at step 204, if there is any significant change in crude type or properties of crude or chemical type. If there is any significant change in crude type or properties of crude or chemical type, the plant engineer performs another field or bottle test at step 206, and establishes a new effective chemical dosage (dosage for corrosion inhibitor or scale inhibitor) in PPM at step 208. At step 210, the plant engineer modifies the base dosage for the chemical injection based on the new effective chemical dosage. However, if there is no significant change in crude type or properties of crude or chemical type, and after step 210, the system test, validates, and implements algorithm at step 212. As an additional step, the system may fine tune the controller to optimize corrosion inhibitor or scale inhibitor injection rate in the GOSP.

After establishing the dosage of a corrosion or scale inhibitor in part per million (PPM) required for a particular service using a particular type of chemical and at normal operating condition as described above, the rate of corrosion or scale inhibition injection will depend on flow rate of the required service. Example Equation 1 below illustrates how to calculate corrosion inhibitor injection rate for liquid service.

$$Q_{CI,L} = ([PPM] * Q_L)/16666.67 \quad (1)$$

Where $Q_{CI,L}$=flow rate of corrosion inhibitor in USGPH (U.S. Gallon per hour)

$Q_L$=flow rate of liquid in USGPM (for wet crude it will based on produced water flow rate.

[PPM]=Corrosion Inhibitor dosage in part per million volume PPM (vol.)

Using typical corrosion inhibitor injection dosage of say 20 PPM as an example, Equation 1 above can be rewritten as follows:

$$Q_{CI,L} = (2Q_L)/1666.67 \quad (2)$$

Example Equation 3 below illustrates how to calculate scale inhibitor rate for liquid service.

$$Q_{SI,L} = ([PPM] * Q_L)/16666.67 \quad (3)$$

Where $Q_{SI,L}$=flow rate of scale inhibitor in USGPH $Q_L$=flow rate of liquid in USGPM (for wet crude it will based on produced water flow rate.

[PPM]=Scale Inhibitor dosage in part per million volume PPM (vol.)

Using typical scale inhibitor injection dosage of say 20 PPM as an example, equation 3 above can be rewritten as follows:

$$Q_{CI,L} = (2Q_L)/1666.67 \quad (4)$$

Figure 3:
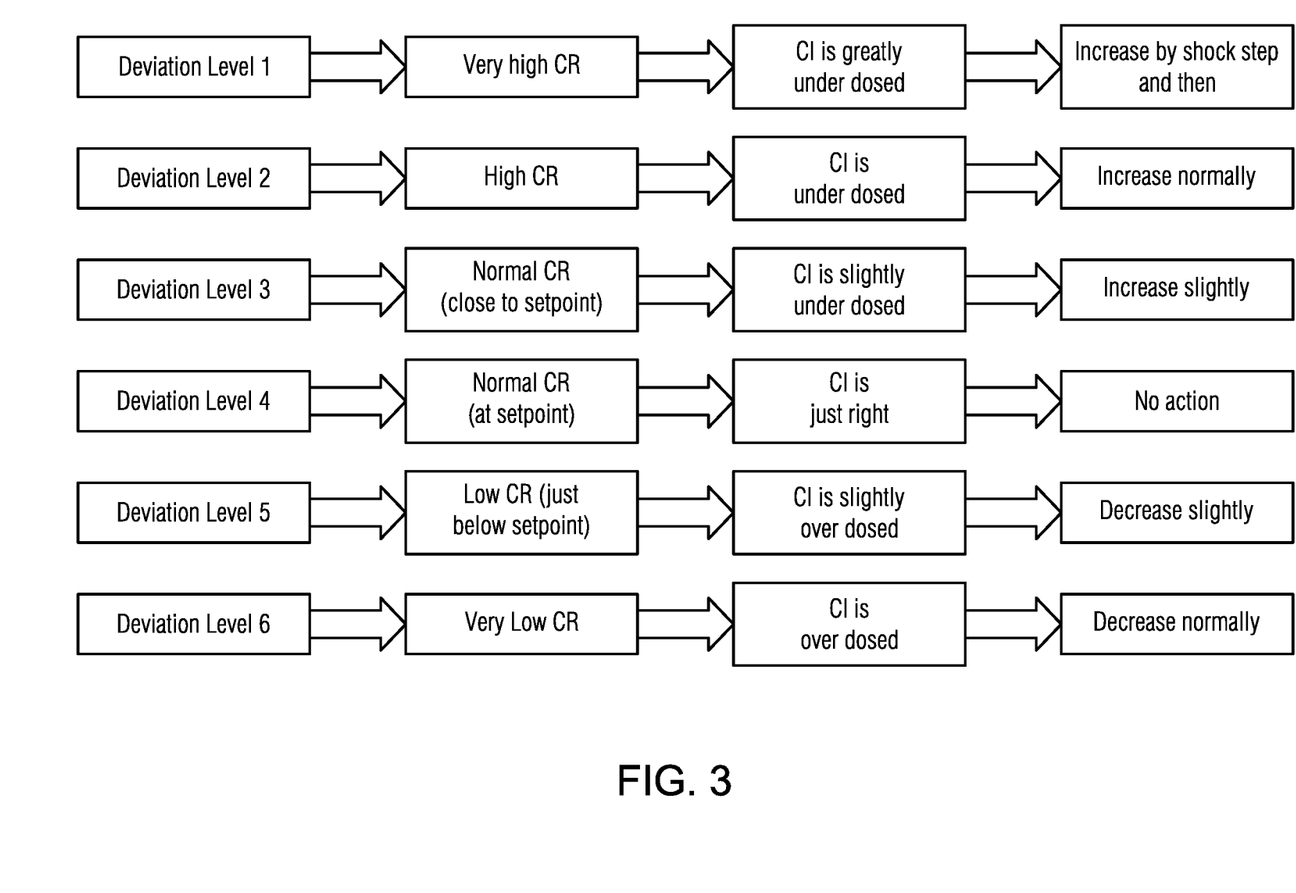
FIG. 3 is a flow diagram illustrating example steps in a method for optimizing corrosion inhibitor injection rate in a GOSP, according to one or more example embodiments of the disclosure.
Figure 4:
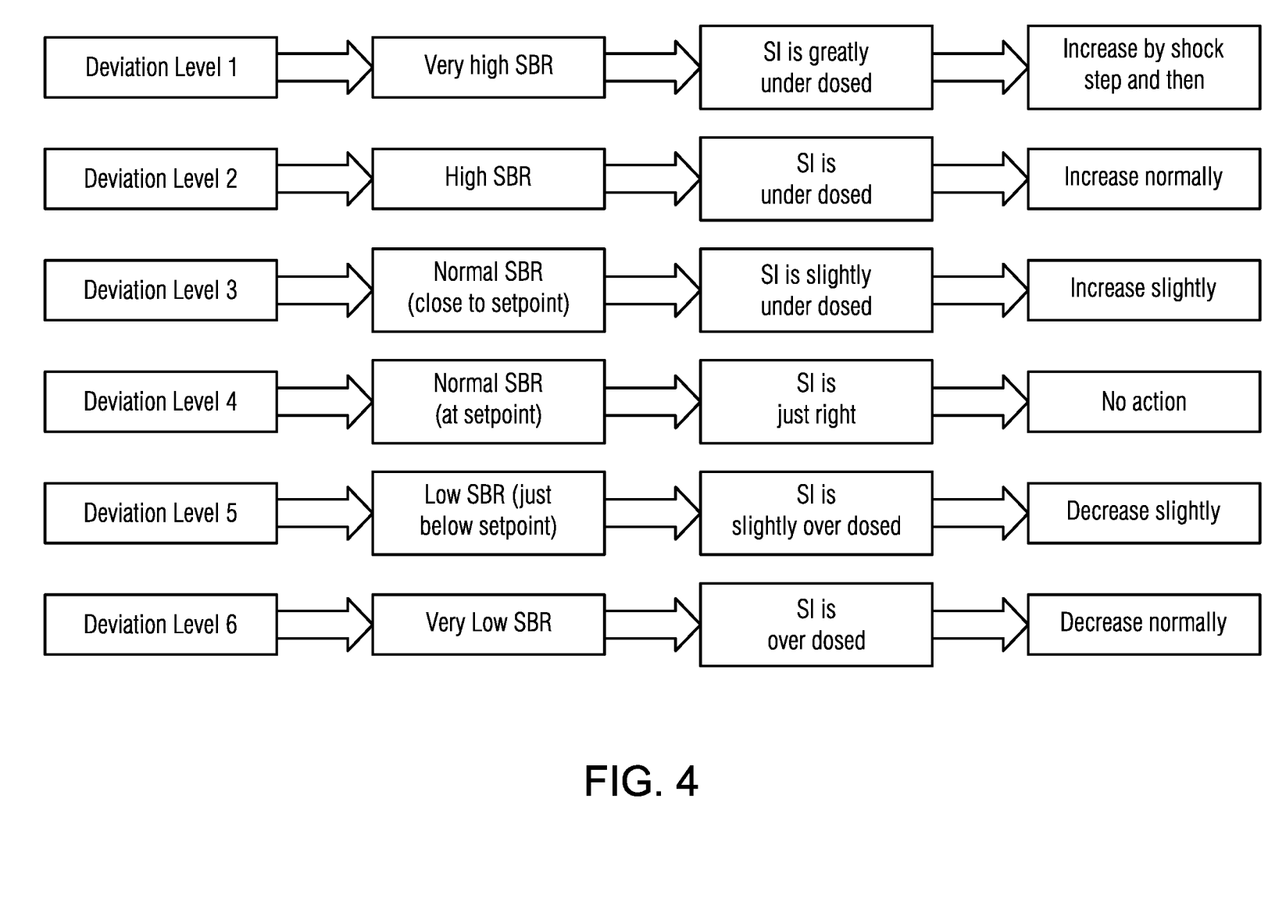
FIG. 4 is a flow diagram illustrating example steps in a method for optimizing scale inhibitor injection rate in a GOSP, according to one or more example embodiments of the disclosure.

Ruled-Based Control Strategy for Chemical (Corrosion and Scale Inhibitor) Injection Rate In order to automate the step of changing the chemical injection dosage to complement the manual plant engineers' efforts through bottle testing (which is done rarely, once in every 4 years), a more frequent adjustment of the dosage based on key performance indicator monitoring is established as a control strategy. The strategy involves adjusting the chemical injection rates with the aim of maintaining the key performance indicators, Corrosion Rate (CR) or Scale Build-up Rate (SBR) at normal set point whenever there is any unexpected change(s) in any other factors or operation parameters that could affect the set point. Six (6) levels of deviation in set point of the KPI (CR or SBR) are used with corresponding action to adjust the chemical injection rates in a rule-based control strategy. The control strategy is represented in FIGS. 3 and 4 corrosion inhibitor and scale inhibitor, respectively. More specifically, FIG. 3 illustrates a rules based control strategy for corrosion inhibitor injection rate, and FIG. 4 illustrates a rules based control strategy for scale inhibitor injection rate.

Table-1 below presents typical ranges of CR deviations from normal set point of 3 mm/25 years or 0.12 mm/year with corresponding percentage increase or decrease in corrosion inhibitor injection rates. The CR readings will be within tolerance of one percent.

| Deviation Level | CR Deviation Range | Required action to change Corrosion inhibitor (CI) injection rate |
| --- | --- | --- |
| Level 1 | CR > 0.24 | Increase Corrosion inhibitor (CI) injection rate by a shock step increment (50%) and then increase rapidly by 25% step increment until CR is ≤0.24. |
| Level 2 | 0.18 ≤ CR ≤ 0.24 | Increase Corrosion inhibitor (CI) injection rate normally by 15% step increment of the established optimum rate until 0.18 ≤ CR ≤ 0.24 |
| Level 3 | 0.12 ≤ CR ≤ 0.18 | Increase Corrosion inhibitor (CI) injection rate slightly by 10% step increment of the established optimum rate until 0.12 ≤ CR ≤ 0.18 |

| Deviation Level | CR Deviation Range | Required action to change Corrosion inhibitor (CI) injection rate |
|---|---|---|
| Level 4 | CR = 0.12 | Keep Corrosion inhibitor (CI) injection rate. This is the optimum Corrosion inhibitor (CI) injection rate. |
| Level 5 | $0.06 \leq CR \leq 0.12$ | Reduce Corrosion inhibitor (CI) injection rate slightly by 10% step decrement of the established optimum rate until $0.06 \leq CR \leq 0.12$. |
| Level 6 | CR < 0.06 | Reduce Corrosion inhibitor (CI) injection rate normally by 25% step decrement of the established optimum rate until CR < 0.06 |

Table-2 below presents typical ranges of SBR deviations from normal set point of 3 mm/25 years or 0.12 mm/year with corresponding percentage increase or decrease in scale inhibitor injection rates. The SBR readings will be within tolerance of one percent.

| Deviation Level | SBR Deviation Range | Require action to change Scale inhibitor (CI) injection rate |
|---|---|---|
| Level 1 | SBR > 0.24 | Increase Scale inhibitor (SI) injection rate by a shock step increment (50%) and then increase rapidly by 25% step increment until SBR is ≤0.24. |
| Level 2 | $0.18 \leq SBR \leq 0.24$ | Increase Scale inhibitor (SI) injection rate normally by 15% step increment of the established optimum rate until $0.18 \leq SBR \leq 0.24$ |
| Level 3 | $0.12 \leq SBR \leq 0.18$ | Increase Scale inhibitor (SI) injection rate slightly by 10% step increment of the established optimum rate until $0.12 \leq SBR \leq 0.18$ |
| Level 4 | SBR = 0.12 | Keep Scale inhibitor (SI) injection rate. This is the optimum scale inhibitor (SI) injection rate. |
| Level 5 | $0.06 \leq SBR \leq 0.12$ | Reduce Scale inhibitor (SI) injection rate slightly by 10% step decrement of the established optimum rate until $0.06 \leq SBR \leq 0.12$. |
| Level 6 | SBR < 0.06 | Reduce Scale inhibitor (SI) injection rate normally by 25% step decrement of the established optimum rate until SBR < 0.06 |

An algorithm for data reading, calculation of corrosion inhibition injection rate, and output to adjust the injection pumps accordingly is presented in following paragraphs.

| Step # | Action To be Taken | |
|---|---|---|
| 1 | Read prevailing established Corrosion Inhibitor (CI) dosages in Part Per Million Volume (PPM) from the SCADA/DCS | |
| 2 | Read current flow rates in USGPM, $Q_L$ for the stream into which the Corrosion Inhibitor is being injected. | |
| 3 | Read current injection rate, $Q_{CI, L}$ in USGPH of the Corrosion Inhibitor | |
| 4 | Read current value of Corrosion Rate (CR) in mm/year from Corrosion Monitoring System (CMS)/Coupon | |
| 5 | Is CR > 0.24 mm/yr? | |
| 6 | If yes to question in Step #5 above, then calculate new Corrosion Inhibitor injection rates $Q'_{CI, L}$ as follows: | If no to question in Step #5 above, then go execute Step #13 |
| | $Q'_{CI, L} = Q_{CI, L+} 0.5*([PPM] * Q_L)/16666.67$ | |
| 7 | Adjust CI injection pumps stroke to inject the new calculated rates of $Q'_{CI, L}$ for 1 day | |
| 8 | Read the value of Corrosion Rate (CR) in mm/year again | |
| 9 | Is CR > 0.24 mm/yr? | |
| 10 | If yes to question in Step #9 above, then calculate new Corrosion Inhibitor injection rates $Q''_{CI, L}$ as follows: $Q''_{CI, L} = Q'_{CI, L+} 0.5*([PPM] * Q_L)/16666.67$ | If no to question in Step #9 above, then go execute Step #13 |
| 11 | Adjust CI injection pumps stroke to inject the new calculated rates of $Q'_{CI, L}$ for 1 day | |
| 12 | Then go back to Step #8 | |
| 13 | $0.18 \leq CR \leq 0.24$? mm/yr | |
| 14 | If yes to question in Step #13 above, then calculate new Corrosion Inhibitor injection rates $Q'_{CI, L}$ as follows: $Q'_{CI, L} = Q_{CI, L+} 0.15*([PPM] * Q_L)/16666.67$ | If no to question in Step #13 above, then go execute Step #18 |
| 15 | Adjust CI injection pumps stroke to inject the new calculated rates of $Q'_{CI, L}$ for 1 day | |
| 16 | Read value of CR again. | |
| 17 | Then go back to Step #13 | |
| 18 | $0.12 \leq CR \leq 0.18$? mm/yr | |
| 19 | If yes to question in Step #18 above, then calculate new Corrosion Inhibitor injection rates $Q'_{CI, L}$ as follows: $Q'_{CI, L} = Q_{CI, L+} 0.10*([PPM] * Q_L)/16666.67$ | If no to question in Step #18 above, then go execute Step #23 |
| 20 | Adjust CI injection pumps stroke to inject the new calculated rates of $Q'_{CI, L}$ for 1 day | |
| 21 | Read value of CR again. | |
| 22 | Then go to Step# 18 | |
| 23 | CR = 0.12 Mm/yr? | |
| 24 | If yes to question in Step #23 above, Maintain current CI injection rates $Q'_{CI, L}$ for 1 day | If no to question in Step #23 above, then go execute Step #26 |
| 25 | Then go back to Step #4 | |
| 26 | $0.06 \leq CR \leq 0.12$? mm/yr | |
| 27 | If yes to question in Step #26 above, then calculate new Corrosion Inhibitor injection rates $Q'_{CI, L}$ as follows: $Q'_{CI, L} = Q_{CI, L-} 0.10*([PPM] * Q_L)/16666.67$ | If no to question in Step #26 above, hen go execute Step #31 |
| 28 | Adjust CI injection pumps stroke to inject the new calculated rates of $Q'_{CI, L}$ for 1 day | |
| 29 | Read value of CR again. | |
| 30 | Then go to Step #26 | |
| 31 | CR < 0.06 mm/year? | |
| 32 | If yes to question in Step #31 above, then calculate new Corrosion Inhibitor injection rates $Q'_{CI, L}$ as follows: $Q'_{CI, L} = Q_{CI, L-} 0.25*([PPM] * Q_L)/16666.67$ | If no to question in Step #31 above, then go execute Step #4 again |
| 33 | Adjust CI injection pumps stroke to inject the new calculated rates of $Q'_{CI, L}$ for 1 day | |
| 34 | Read value of CR again. | |
| 35 | Then go to Step #31 to check | |

An algorithm for data reading, calculation of scaling inhibition injection rate, and output to adjust the injection pumps accordingly is presented in following paragraphs.

| Step # | Action To be Taken | |
|---|---|---|
| 1 | Read prevailing established scaling Inhibitor (SI) dosages in Part Per Million Volume (PPM) from the SCADA/DCS | |
| 2 | Read current flow rates in USGPM, $Q_L$ for the stream into which the Scaling Inhibitor is being injected. | |
| 3 | Read current injection rate, $Q_{CI, L}$ in USGPH of the Scaling Inhibitor | |
| 4 | Read current value of Scaling Rate (SR) in mm/year from Scaling Monitoring System (SMS) | |
| 5 | Is SR > 0.24 mm/yr? | |
| 6 | If yes to question in Step #5 above, then calculate new scaling Inhibitor injection rates $Q'_{SI, L}$ as follows: $Q'_{SI, L} = Q_{SI, L+} 0.5*([PPM] * Q_L)/16666.67$ | If no to question in Step #5 above, then go execute Step #13 |
| 7 | Adjust SI injection pumps stroke to inject the new calculated rates of $Q'_{SI, L}$ for 1 day | |
| 8 | Read the value of Scaling Rate (CR) in mm/year again | |
| 9 | Is SR > 0.24 mm/yr? | |
| 10 | If yes to question in Step #9 above, then calculate new Scaling Inhibitor injection rates $Q''_{SI, L}$ as follows: $Q''_{SI, L} = Q'_{SI, L+} 0.5 *([PPM] * Q_L)/16666.67$ | If no to question in Step #9 above, then go execute Step #13 |
| 11 | Adjust SI injection pumps stroke to inject the new calculated rates of $Q'_{SI, L}$ for 1 day | |
| 12 | Then go back to Step #8 | |
| 13 | $0.18 \le SR \le 0.24$? mm/yr | |
| 14 | If yes to question in Step #13 above, then calculate new Scaling Inhibitor injection rates $Q'_{SI, L}$ as follows: $Q'_{SI, L} = Q_{SI, L+} 0.15*([PPM] * Q_L)/16666.67$ | If no to question in Step #13 above, then go 8 execute Step #1 |
| 15 | Adjust SI injection pumps stroke to inject the new calculated rates of $Q'_{SI, L}$ for 1 day | |
| 16 | Read value of SR again. | |
| 17 | Then go back to Step #13 | |
| 18 | $0.12 \le SR \le 0.18$? mm/yr | |
| 19 | If yes to question in Step #18 above, then calculate new scaling Inhibitor injection rates $Q'_{SI, L}$ as follows: $Q'_{SI, L} = Q_{SI, L+} 0.10*([PPM] * Q_L)/16666.67$ | If no to question in Step #18 above, then go 3 execute Step #2 |
| 20 | Adjust SI injection pumps stroke to inject the new calculated rates of $Q'_{SI, L}$ for 1 day | |
| 21 | Read value of SR again. | |
| 22 | Then go to Step# 18 | |
| 23 | SR = 0.12 Mm/yr? | |
| 24 | If yes to question in Step #23 above, Maintain current SI injection rates $Q'_{SI, L}$ for 1 day | If no to question in Step #23 above, then go execute Step #26 |
| 25 | Then go back to Step #4 | |
| 26 | $0.06 \le SR \le 0.12$? mm/yr | |
| 27 | If yes to question in Step #26 above, then calculate new Scaling Inhibitor injection rates $Q'_{SI, L}$ as follows: $Q'_{SI, L} = Q_{SI, L-} 0.10*([PPM] * Q_L)/16666.67$ | If no to question in Step #26 above, then go execute Step #31 |
| 28 | Adjust SI injection pumps stroke to inject the new calculated rates of $Q'_{SI, L}$ for 1 day | |
| 29 | Read value of SR again. | |
| 30 | Then go to Step #26 | |
| 31 | SR < 0.06 mm/year? | |
| 32 | If yes to question in Step #31 above, then calculate new Scaling Inhibitor injection rates $Q'_{SI, L}$ as follows: $Q'_{SI, L} = Q_{SI, L-} 0.25*([PPM] * Q_L)/16666.67$ | If no to question in Step #31 above, then go execute Step #4 again |
| 33 | Adjust SI injection pumps stroke to inject the new calculated rates of $Q'_{SI, L}$ for 1 day | |
| 34 | Read value of SR again. | |
| 35 | Then go to Step #31 to check | |

In some embodiments, the system may include remote controllable pumps, which allow the injection rate to be adjusted through the DCS/SCADA. The pumps skid may include a Coriolis meter which is a micro-motion flow meter for each pump, to monitor the flow rates of each injection line and a flow transmitter to provide DCS/SCADA readable data. Similarly, flow rates readings of all required streams required as input data for the automatic control algorithm for corrosion inhibitor injection rate as described in above control algorithm, are provided with field measuring devices with their corresponding transmitters to make them available on the DCS/SCADA.

For implementation of the control algorithm, the DCS/SCADA system must be capable of obtaining all the required data readings and using these data in calculating all corrosion or scale inhibitor injection flow rates as required to provide output set point for the flow controller to adjust the injection flow rate appropriately. The data reading can be done at a specified sampling rate which can be fixed base on control loop scan time required between data reading and adjusting the corrosion or scale inhibitor injection rate and rate of change of flow rates of production streams to which the corrosion inhibitor is injected based on historical data.

System Requirements

All logic configurations may be implemented in the Distributed Control System (DCS)/SCADA of the GOSP. The corrosion inhibitor and scale inhibitor pumps may take action based on set conditions. Each condition may initiate an action by calculating and changing the PID flow controller (Cascade Mode) set point which lead to increase or decrease of the pump stroke adjuster to meet the required flow rate. For cases where there are two pumps (one in service and other on standby), the controller output may be configured such that the action to control the pump stroke adjuster is directed to the main dosing pumps at first instance and in case one of the two pumps is unavailable, it may be directed to the standby pump. Alternatively, the system can be configured such that the console operator can switch from one pump to other. The data reading may be done at a specified sampling rate which may be fixed based on one or more of analysis cycle rates for corrosion and scale build up rate, control loop scan time required between data reading and adjusting the corrosion inhibitor/scale inhibitor injection rate, and corrosion inhibitor/scale inhibitor circulation time required for injection at previous rate to properly circulate and reflect the injected chemical in the system.

In a modern GOSP facility all hardware devices such as crude and water flow meters, online corrosion rate and scale build-up rate meters, etc., may be required for the automation of corrosion inhibitor and scale inhibitor injection and they are normally in place except that sometimes manual stroke adjustable corrosion inhibitor injection and scale inhibitor pumps may be installed and may require replacement. These stroke adjustable pumps can only be controlled by manual pump stroke adjustment at the pumps using graduated-bottle gauging system to set injection rates. Therefore, these pumps may need to be replaced with Electronic Capacity Control (ECC) types which are remote controllable pumps, to allow the injection rates to be adjusted through the DCS/SCADA.

Because the control strategy to be adopted for the system is a ruled-based programmable logic control, the strategy may involve adjusting the corrosion inhibitor injection rates with the aim of maintaining the key performance indicators (corrosion and scale build up rate) at normal set point whenever there is/are any unexpected change(s) in any other factors or operation parameters that could affect the set point. The systems and methods provide accurate and efficient online measurements for continuous reading of corrosion and scale build-up rates and input to the DCS/SCADA, which may provide the main performance indicator data on which the control algorithm relies.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A system for optimizing corrosion inhibitor injection rate in a process plant, the system comprising:
   a programmable logic controller operatively coupled to a control unit associated with the plant, the controller configured to:
   receive a current flow rate for a fluid stream into which the corrosion inhibitor is injected;
   receive a current injection rate of the corrosion inhibitor;
   receive a current value of corrosion rate from a corrosion monitoring system;
   determine that the corrosion rate is greater than a predetermined threshold value;
   determine a new corrosion inhibitor injection rate; and
   cause to modify the injection rate in one or more pumps to the new corrosion inhibitor injection rate, wherein the new corrosion inhibitor injection rate is determined based on the formula:

$$Q_{SI,L}=([PPM]*Q_L)/16666.67$$

where $Q_{SI,L}$ =flow rate of corrosion inhibitor;
$Q_L$ =flow rate of fluid; and
[PPM] =Corrosion Inhibitor dosage in part per million volume (PPM).

2. The system of claim 1, wherein the step of modifying the injection rate in one or more pumps includes adjusting a stroke in one or more of the corrosion inhibitor injection pumps.

3. The system of claim 1, wherein the fluid stream flow rate is measured in U.S. gallons per minute.

4. The system of claim 1, wherein the corrosion inhibitor injection rate is measured in U.S. gallons per hour.

5. A method for optimizing corrosion inhibitor injection rate in a process plant, the method comprising:
   receiving, by a controller, a current flow rate for a fluid stream into which the corrosion inhibitor is injected;
   receiving a current injection rate of the corrosion inhibitor;
   receiving a current value of corrosion rate from a corrosion monitoring system;
   determining that the corrosion rate is greater than a predetermined threshold value;
   determining a new corrosion inhibitor injection rate; and
   causing to modify the injection rate in one or more pumps to the new corrosion inhibitor injection rate, wherein the new corrosion inhibitor injection rate is determined based on the formula:

$$Q_{SI,L}=([PPM]*Q_L)/16666.67$$

where $Q_{SI,L}$=flow rate of corrosion inhibitor;
$Q_L$=flow rate of fluid; and
[PPM] =Corrosion Inhibitor dosage in part per million volume (PPM).

6. The method of claim 5, wherein the step of modifying the injection rate in one or more pumps includes adjusting a stroke in one or more of the corrosion inhibitor injection pumps.

7. The method of claim 5, wherein the fluid stream flow rate is measured in U.S. gallons per minute.

8. The method of claim 5, wherein the corrosion inhibitor injection rate is measured in U.S. gallons per hour.

9. A system for optimizing scaling inhibitor injection rate in a process plant, the system comprising:
   a programmable logic controller operatively coupled to a control unit associated with the plant, the controller configure to:
      receive a current flow rate for a fluid stream into which the scaling inhibitor is injected;
      receive a current injection rate of the scaling inhibitor;
      receive a current value of scaling rate from a scaling monitoring system;
      determine that the scaling rate is greater than a predetermined threshold value;
      determine a new scaling inhibitor injection rate; and
      cause to modify the injection rate in one or more pumps to the new scaling inhibitor injection rate, wherein the new scaling inhibitor injection rate is determined based on the formula:

$$Q_{SI,L}=([PPM]*Q_L)/16666.67$$

where $Q_{SI,L}$=flow rate of scaling inhibitor;
QL=flow rate of fluid; and
[PPM]=Scaling Inhibitor dosage in part per million volume (PPM).

10. The system of claim 9, wherein the step of modifying the injection rate in one or more pumps includes adjusting a stroke in one or more of the scaling inhibitor injection pumps.

11. The system of claim 9, wherein the fluid stream flow rate is measured in U.S. gallons per minute.

12. The system of claim 9, wherein the scaling inhibitor injection rate is measured in U.S. gallons per hour.

13. A method for optimizing scaling inhibitor injection rate in a process plant, the method comprising:
   receiving, by a controller, a current flow rate for a fluid stream into which the scaling inhibitor is injected;
   receiving a current injection rate of the scaling inhibitor;
   receiving a current value of scaling rate from a scaling monitoring system;
   determining that the scaling rate is greater than a predetermined threshold value;
   determining a new scaling inhibitor injection rate; and
   causing to modify the injection rate in one or more pumps to the new scaling inhibitor injection rate, wherein the new scaling inhibitor injection rate is determined based on the formula:

$$Q_{SI,L}=([PPM]*Q_L)/16666.67$$

where $Q_{SI,L}$=flow rate of scaling inhibitor;
$Q_L$=flow rate of fluid; and
[PPM]=Scaling Inhibitor dosage in part per million volume (PPM).

14. The method of claim 13, wherein the step of modifying the injection rate in one or more pumps includes adjusting a stroke in one or more of the scaling inhibitor injection pumps.

15. The method of claim 13, wherein the fluid stream flow rate is measured in U.S. gallons per minute.

16. The method of claim 13, wherein the scaling inhibitor injection rate is measured in U.S. gallons per hour.

* * * * *